(12) United States Patent
Ise

(10) Patent No.: US 6,456,345 B1
(45) Date of Patent: Sep. 24, 2002

(54) LIGHT CONTROLLING APPARATUS

(75) Inventor: Koichi Ise, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/301,557

(22) Filed: Apr. 29, 1999

(30) Foreign Application Priority Data

May 13, 1998 (JP) .......................................... 10-130388

(51) Int. Cl.$^7$ .......................................... G02F 1/3335
(52) U.S. Cl. .......................... 349/96; 349/74; 359/292
(58) Field of Search .......................... 349/96, 74, 105, 349/117; 359/292, 227, 297

(56) References Cited

U.S. PATENT DOCUMENTS

| | | | | |
|---|---|---|---|---|
| 5,488,496 A | * | 1/1996 | Pine | 349/96 |
| 5,548,422 A | * | 8/1996 | Conner et al. | 359/65 |
| 5,642,214 A | * | 6/1997 | Ishii et al. | 249/96 |
| 5,666,578 A | * | 9/1997 | Oikawa et al. | 396/319 |
| 6,016,178 A | * | 1/2000 | Kataoka et al. | 349/117 |
| 6,094,539 A | * | 7/2000 | Abe | 396/225 |
| 6,204,901 B1 | * | 3/2001 | Knox | 349/96 |

* cited by examiner

*Primary Examiner*—Toan Ton
*Assistant Examiner*—Hoan Nguyen
(74) *Attorney, Agent, or Firm*—Ronald P. Kananen, Esq.; Rader, Fishman, Grauer, PLLC.

(57) ABSTRACT

A light controlling apparatus comprises a GH cell and a polarizing plate. The polarizing plate is attached to an iris blade, and movable inside/outside the effective optical path of the light incident to the GH cell. The iris blades are driven by a motor not shown in the drawing to overlap each other, and at the time, the polarizing plate is moved inside the effective optical path to cover the aperture. If the brightness of an object increases more, the GH cell absorbs the light to control the light. Because the polarizing plate is movable outside the effective optical path of the light, the light is not absorbed by the polarizing plate, and the maximum transmittance of the light controlling apparatus is increased, therefore the contrast ratio is increased and the light quantity is maintained uniform.

18 Claims, 4 Drawing Sheets

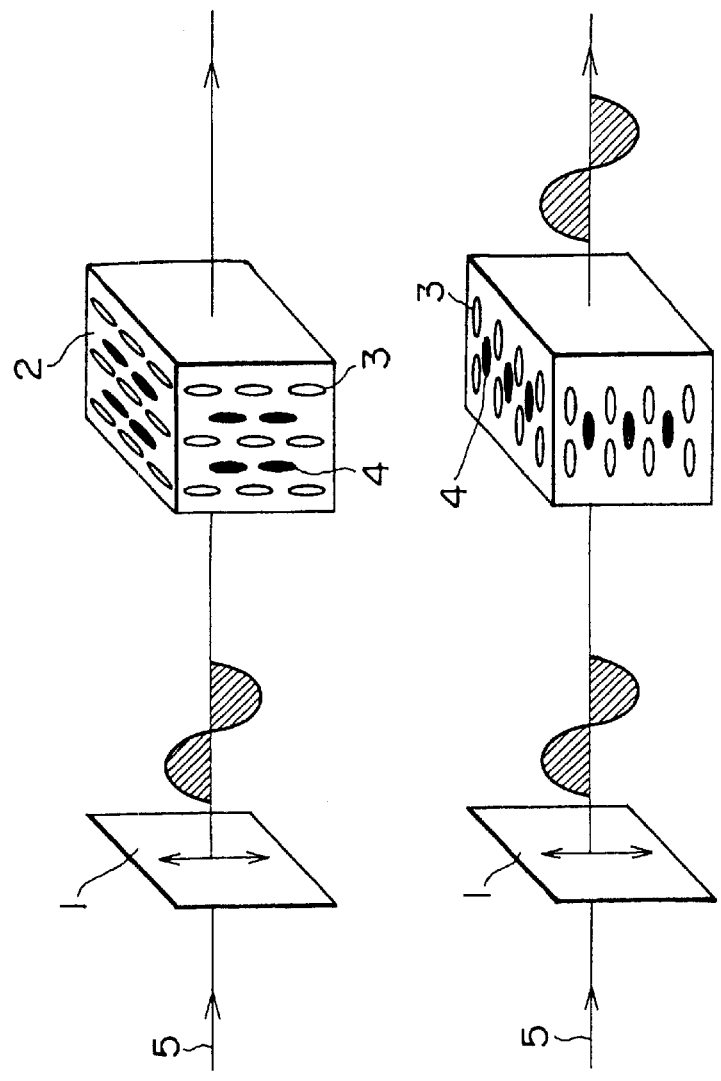
FIG. 7A NO VOLTAGE APPLIED
FIG. 7B A VOLTAGE APPLIED

LIGHT CONTROLLING APPARATUS

BACKGROUND OF THE INVENTION

1. Field of the Invention

This invention relates to a light controlling apparatus for enhancing the contrast ratio and maintaining the light quantity uniform.

2. Description of Related Art

Usually a polarizing plate is used for a light controlling apparatus which uses a liquid crystal cell. For example, a TN (Twisted Nematic) liquid crystal cell or a guest-host liquid cell (GH (Guest Host) cell) is used as the liquid crystal cell.

FIG. 7A and FIG. 7B are schematic diagrams for describing the operational principle of a conventional light controlling apparatus. The light controlling apparatus comprises mainly a polarizing plate 1 and a GH cell 2. The GH cell 2 is sealed between two glass plates. Liquid crystal molecules 3 and dichromatic dye molecules 4 are sealed in the GH cell 2. Dichromatic dye molecules 4 exhibits the anisotropic light absorption. In detail, the type of this dichromatic dye molecules 4 is p-type, which absorbs the light of major axis direction of a molecule. The liquid crystal molecules 3 exhibit the positive dielectric anisotropy.

FIG. 7A shows the GH cell 2 to which no voltage is applied (no voltage application). The incident light 5 is converted to a linear polarized light by passing through the polarizing plate 1. In FIG. 7A, because the polarization direction is identical with the major axis direction of dichromatic dye molecules 4, the light is absorbed by the dichromatic dye molecules 4 and the transmittance of the GH cell is reduced.

A voltage is applied as shown in FIG. 7B. Then, the major axis direction of the dichromatic dye molecules 4 is turned to the direction perpendicular to the defection of the linear polarized light. Therefore, the light is not absorbed by the GH cell 2.

If n-type dichromatic dye molecules, which absorb the light of the minor axis direction of the molecules, is used, the light is not absorbed when no voltage is applied and is absorbed when a voltage is applied contrary to the case of the above-mentioned p-type dichromatic dye molecules 4.

In the case of the light controlling apparatus shown in FIG. 7, the ratio of absorption under application of a voltage to the ratio under application of no voltage, namely ratio of optical density, is about 10. This optical density ratio is about twice that of a light controlling apparatus comprising only a GH cell without a polarizing plate 1.

In a conventional light controlling apparatus, a polarizing plate is placed on the optical path of the light fixedly. Therefore, 50% of light is absorbed by the polarizing plate consistently. Further, the surface reflection from the polarizing plate affects the light. The maximum light transmittance of the light which passes the polarizing plate does not exceeds 50%, and the reduction of light quantity is significant. The light quantity reduction is one of the factors which hinder the commercialization of the light controlling apparatus having a liquid crystal cell.

On the other hand, various light controlling apparatus which do not use a polarizing plate have been proposed. As an example of the light controlling apparatus having no polarizing plate, a light controlling apparatus having a two-layered GH cell has been known. The first layer of the GH cell absorbs the polarized component in the same direction as that of a certain polarized light and the second layer absorbs the polarized component in the perpendicular direction to that of the polarized light. As another example of the light controlling apparatus having no polarizing plate, a light controlling apparatus which utilizes the cholesteric-nematic liquid crystal phase transition has been known. Further, a polymer scattering type light controlling apparatus which utilizes liquid crystal scattering has been known.

However, these light controlling apparatus having no polarizing plate can not exhibit the ratio of absorbance under no voltage application to the ratio under application of a voltage, namely the ratio of optical density, which exceeds 5 as described herein above. As a result, since the contrast ratio of the light controlling apparatus is small, such light controlling apparatus are insufficient for normal light control in the environment ranging from a dark place to a bright place. The polymer scattering type light controlling apparatus is significantly poorer in the image-forming performance of the image sensing optical system.

SUMMARY OF THE INVENTION

The present invention was accomplished to solve the above-mentioned problems. It is the object of the present invention to provide a light controlling apparatus which enhances the contrast ratio and maintains the light quantity uniform.

To solve the above-mentioned problems, a light controlling apparatus in accordance with the present invention is provided with a liquid crystal cell and a polarizing plate which is movable inside/outside the effective optical path of the light incident to the liquid crystal cell.

Because the polarizing plate is movable outside the effective optical path of the light, the light is not absorbed by the polarizing plate, and the maximum transmittance of the light controlling apparatus is increased.

The polarizing plate is desirably made movable inside/outside the effective optical path by providing the polarizing plate on the movable portion of a mechanical iris.

Because the polarizing plate is moved out or in by means of the mechanical iris, the light controlling apparatus is realized easily.

The liquid crystal cell is desirably a guest-host type liquid crystal cell.

Because a guest-host type liquid crystal cell is used, the light is controlled by absorbance of the light by the guest-host type liquid crystal cell itself.

The polarizing plate is desirably made movable inside/outside the effective optical path by providing the polarizing plate on the movable portion of a mechanical iris, and the liquid crystal cell is desirably a guest-host type liquid crystal cell.

The liquid crystal cell desirably comprises a first guest-host type liquid crystal cell which is capable of switching between absorption and transmission of the same polarized component in the direction as the polarized component which is absorbed by the polarizing plate, and a second guest-host type liquid crystal cell which is capable of switching between absorption and transmission of the polarized component perpendicular to the polarized component which is absorbed by the polarizing plate.

Therefore, the first guest-host type liquid crystal cell absorbs the same polarized component as the polarized component which is absorbed by the polarizing plate. In the middle of moving in/out of the polarizing plate, the transmitted light quantity on the portion of the aperture where the polarizing plate does not cover is equalized to that of the portion of the aperture where the polarizing plate covers.

The liquid crystal cell desirably comprises first and second guest-host type liquid crystal cells which are capable of switching between absorption and transmission of the polarized component perpendicular to the polarized component which is absorbed by the polarizing plate.

Therefore, these two first and second guest-host type liquid crystal cells both absorb the light which passes the polarizing plate. As the result, the minimum transmittance of the light controlling apparatus is lowered.

The liquid crystal cell desirably comprises a first guest-host type liquid crystal cell which is capable of switching between absorption and transmission of the same polarized component in the direction as the polarized component which is absorbed by the polarizing plate, and second and third guest-host type liquid crystal cells which are capable of switching between absorption and transmission of the polarized component perpendicular to the polarized component which is absorbed by the polarizing plate.

Therefore, the first guest-host type liquid cell absorbs the same polarized component as the polarized component which is absorbed by the polarizing plate. Further, the second and third guest-host type liquid crystal cells both absorb the light which passes the polarizing plate. As the result, the first guest-host type liquid crystal cell functions to equalize the transmitted light quantify on the portion of the aperture where the polarizing plate does not cover to the transmitted light quantity on the portion of the aperture where the polarizing plate covers. Simultaneously, the second and third guest-host type liquid cells function to reduce the minimum transmittance of the light controlling apparatus more.

BRIEF DESCRIPTION OF THE DRAWINGS

FIG. 7A and FIG. 7B are schematic diagrams for describing the light controlling apparatus in accordance with the fourth embodiment of the present invention.

DETAILED DESCRIPTION OF THE PREFERRED EMBODIMENTS

Embodiments of the present invention will be described in detail hereinafter with reference to the drawings.

Figure 1:
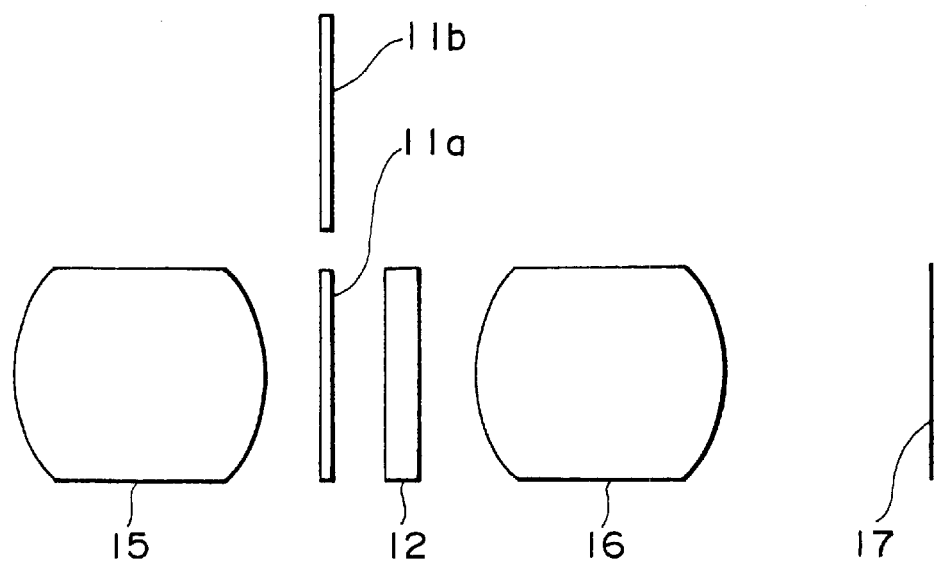
FIG. 1 is a schematic side view of a light controlling apparatus in accordance with the first embodiment of the present invention.

FIG. 1 is a side view of a light controlling apparatus in accordance with the first embodiment of the present invention. The light controlling apparatus comprises a guest-host type liquid crystal cell (abbreviated as "GH cell" hereinafter) and a polarizing plate 11a. The GH cell 12 is sealed between two glass plates. In the GH cell 12, liquid crystal molecules not shown in the drawing and dichromatic dye molecules not shown in the drawing are sealed. The dichromatic dye molecule exhibits the light absorption anisotropy. In detail, the dichromatic dye molecule is of the p-type, which absorbs the light in the direction of the major axis of the molecule. In this case, the liquid crystal molecules exhibit, for example, positive dielectric anisotropy.

The light controlling apparatus is located between a front lens group 15 and a rear lens group 16 comprising a plurality of lenses, for example, like a zoom lens. The light which passes the front lens group 15 is converted to a linear polarized light through a polarizing plate 11a, and incident to the GH cell 12. The light which passes through the GH cell 12 is converged by the rear lens group 16, and projected on the imaging plane 17 to form an image.

The polarizing plate 11a, which is a component of the light controlling apparatus, is removable from the effective optical path of the light incident to the GH cell 12. In detail, a mechanical iris is used as a means for moving the polarizing plate 11a.

Figure 2:
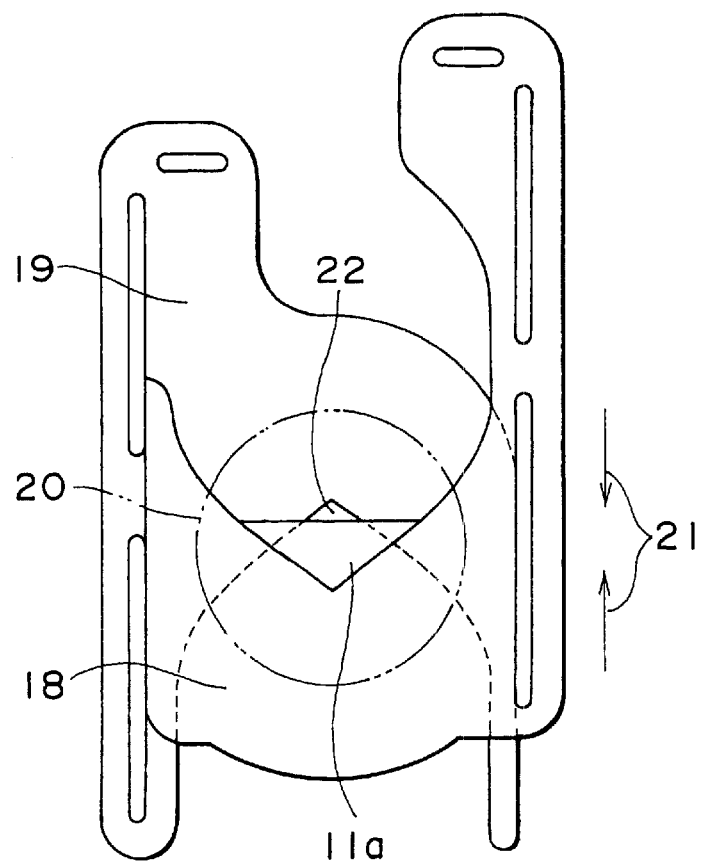
FIG. 2 is a plan view of a mechanical iris.

FIG. 2 is a plan view of the mechanical iris. The mechanical iris is a mechanical diaphragm device used generally for digital still cameras and video cameras. The mechanical iris comprises mainly two iris blades 18 and 19 and a polarizing plate 11a which is attached on the iris blade 18. The iris blades 18 and 19 are movable in the vertical direction. Both iris blades 18 and 19 are moved in the direction of the arrow 21 by means of a driving motor not shown in the drawing. Thereby, the iris blades 18 and 19 are overlapped partially as shown in FIG. 2. As the overlapped portion increases, the aperture 22 on the effective optical path 20 located at the center of the iris blades 18 and 19 is covered by the polarizing plate 11a.

Figure 3A:
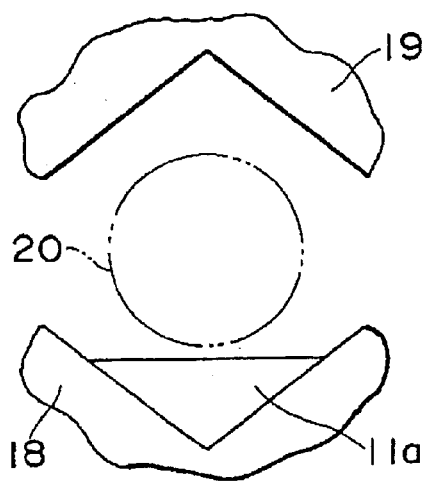
FIG. 3A to FIG. 3C are partially enlarged views for illustrating the mechanical iris at the place near the effective optical path 20.
Figures 3B, 3C:
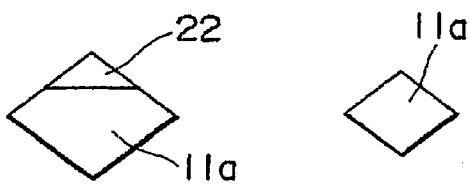

FIG. 3A to FIG. 3C are partially enlarged views of the mechanical iris near the effective optical path 20. The iris blade 19 is moved upward synchronously with the iris blade 18 when it is moved downward, and simultaneously the polarizing plate 11a, which is attached to the iris blade 18, is moved to the outside of the effective optical path 20. Contrary to this direction, when the iris blade 18 is moved upward or the iris blade 19 is moved downward, the iris blades 18 and 19 overlap each other. Then, the polarizing plate 11a is moved on to the effective optical path 20 as shown in FIG. 3B, and covers gradually the aperture 22. As overlapping of the iris blades 18 and 19 increases, the polarizing plate 11a covers finally the entire surface of the aperture 20.

Next, the light controlling operation of the light controlling apparatus having a mechanical iris is described.

As an object (not shown in the drawings) becomes brighter, the iris blades 18 and 19 which are opened vertically are driven by a motor (not shown in the drawings) and begin to overlap. Then, the polarizing plate 11a, which is attached to the iris blade 18, begins to cover the effective optical path 20 and covers partially the aperture 22 (FIG. 3B) Then, the GH cell 12 does not absorb the light. (The GH cell 12 absorbs the light a little due to thermal fluctuation and surface reflection). Finally, the polarizing plate 11a covers the entire surface of the aperture 22 (FIG. 3C). If the object becomes brighter, the voltage applied on the GH cell 12 is reduced to zero, and the light is controlled by absorption of the light by the GH cell 12.

When the object becomes darker, first the absorption of the light by the GH cell is reduced by applying the voltage to the GH cell 12. When the object becomes darker, the iris blade 18 is moved downward and the iris blade 19 is moved upward by driving a motor not shown in the drawing. As the result, the polarizing plate 11a is moved away outside the effective optical path 20 (FIG. 3A).

According to the above-mentioned first embodiment, because the polarizing plate 11a (transmittance of 40% to 50%) can be moved away from the effective optical path 20 of the light, the light is not absorbed by the polarizing plate 11a. Therefore, the maximum transmittance of a light controlling apparatus is enhanced twice or more. In detail, the maximum transmittance of the light controlling apparatus according to the first embodiment of the present invention is about twice that of a conventional light controlling apparatus comprising a fixed polarizing plate and GH cell. The minimum transmittance is the same for both light controlling apparatus.

The polarizing plate 11a is moved out/in by means of the mechanical iris which is practically used for digital still cameras. Thereby, the light controlling apparatus is easily realized.

Because the GH cell 12 is used in addition to the polarizing plate 11a for light controlling, the light is controlled by light absorption of the GH cell itself.

The liquid crystal molecule of negative dielectric anisotropy may be used and dichromatic dye molecule of n-type may be used in the GH cell 12 used in the above-mentioned first embodiment.

Figure 4:
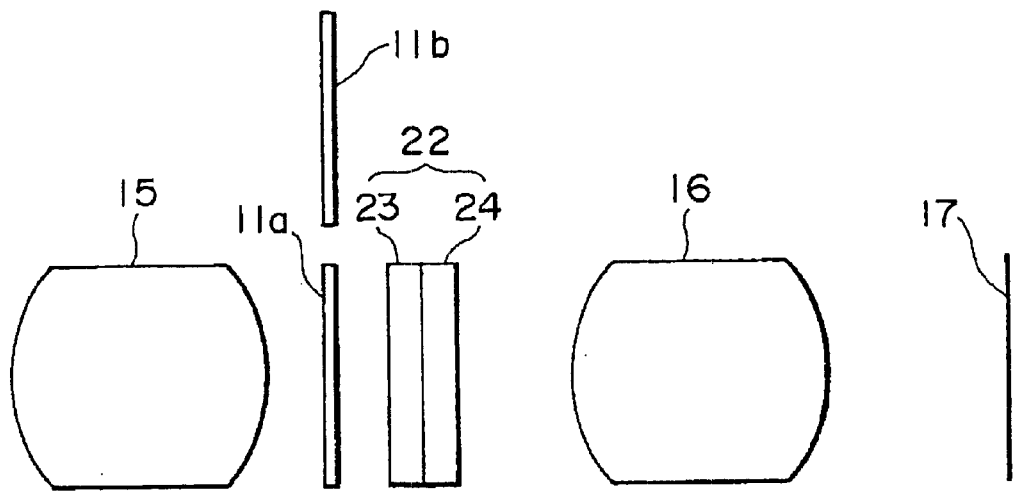
FIG. 4 is aside view of a light controlling apparatus in accordance with the second embodiment of the present invention.

FIG. 4 is a side view of a light controlling apparatus in accordance with the second embodiment of the present invention. The same components as used in the first embodiment are given the same reference characters as given in the first embodiment.

The light controlling apparatus comprises a polarizing plate 11a and a GH cell 22. The polarizing plate 11a is movable to the position shown with the polarizing plate 11b outside the effective optical path of the light.

The GH cell 22 comprises the first GH cell 23 and the second GH cell 24 which are placed side by side. The first GH cell 23 absorbs or transmits the same polarized component as the polarized component which is absorbed by the polarizing plate 11a. The second GH cell 24 absorbs or transmits the polarized component perpendicular to the polarized component which is absorbed by the polarizing plate 11a. For example, the GH cell 12 used in the first embodiment is used as the first GH cell 23. For example, a GH cell which is at the position where the GH cell 12 is rotated 90 degrees with respect to the axis of the incident light is used as the second GH cell 24.

The light controlling operation of the light controlling apparatus in accordance with the second embodiment is described. When the iris blades 18 and 19 are opened, the polarizing plate 11a is located outside the effective optical path, namely at the position of the polarizing plate 11b. Then, the first GH cell 23 absorbs the same polarized component as the polarized component which is absorbed by the polarizing plate 11b out of the light which passes through the front lens group 15.

Next, the iris blades 18 and 19 move toward the center to be overlapped, the polarizing plate 11b is moved gradually inside the effective optical path 20. In the middle of covering the effective optical path 20 by the polarizing plate 11b (11a), the entire surface of the aperture 22 is not covered by the polarizing plate 11b (11a). However, the first GH cell 23 absorbs already the same polarized component in the direction as the polarized component which is to be absorbed by the polarizing plate 11a. Therefore, the light transmittance of the same polarized component in the direction as the polarized component which is to be absorbed by the polarizing plate 11a of the portion of the aperture 22 where the polarizing plate does not cover is equalized to that of another portion of the aperture 22 where the polarizing plate 11a covers.

Overlapping of the iris blades 18 and 19 proceeds more, and the polarizing plate 11a covers the entire aperture 22 finally. Then, the second GH cell 24 absorbs the polarized component of the light perpendicular to the polarized component which is to be absorbed by the polarizing plate 11a.

According to the above-mentioned second embodiment, the same effect as obtained by the first embodiment is obtained.

When the polarizing plate 11a covers not the entire aperture 22, the first GH cell 23 already absorbs the same polarized component in the direction as the polarized component which is to be absorbed by the polarizing plate 11a. Therefore, the light transmittance of the same polarized component in the direction as the polarized component which is to be absorbed by the polarizing plate 11a of the portion of the aperture 22 where the polarizing plate 11a does not cover can be equalized to that of another portion of the aperture 22 where the polarizing plate 11a covers. Thereby, the non-uniform light quantity of the aperture 22 due to cutting of the effective optical path by use of the polarizing plate 11a is prevented. Thus the light quantity around the imaging plane 17 can be made uniform. In detail, the shading phenomenon, that one side of the periphery of the imaging plane 17 (for example, upper side periphery of the imaging plane 17) is dark, is prevented.

Deterioration in imaging performance of the image-forming optical system due to diffraction caused from non-uniform transmittance of the aperture 22 is prevented.

Further, a combination of liquid crystals of positive dielectric anisotropy and negative dielectric anisotropy may be used, and a combination of p-type dichromatic dye and n-type dichromatic dye may be used as the GH cell 22 which is used in the above-mentioned second embodiment.

Figure 5:
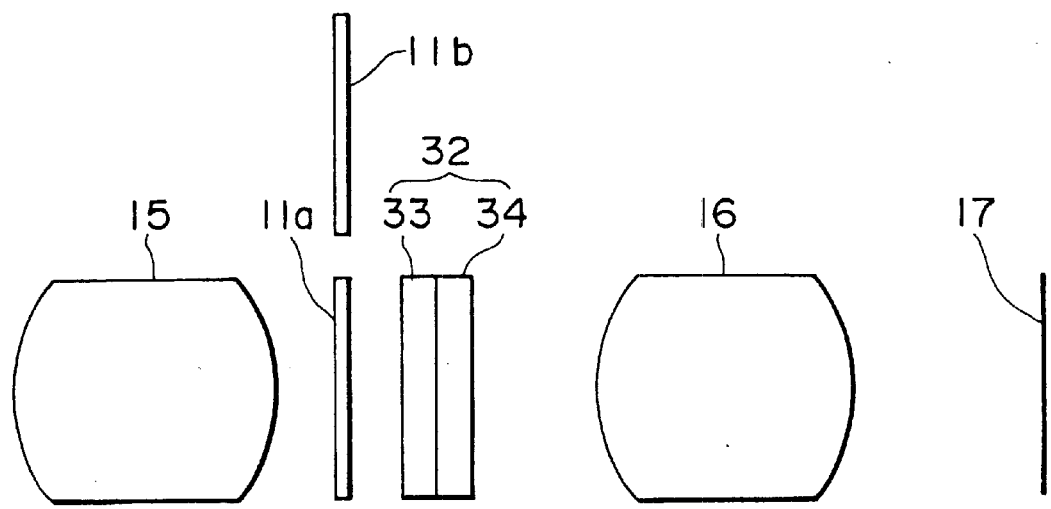
FIG. 5 is a side view of a light controlling apparatus in accordance with the third embodiment of the present invention.

FIG. 5 is a side view of a light controlling apparatus in accordance with the third embodiment of the present invention. The same components as described in the first and the second embodiments are given the same reference characters as given in the first and the second embodiments.

This light controlling apparatus comprises a polarizing plate 11a and a GH cell 32. The polarizing plate 11a is movable to the position which is indicated with the polarizing plate 11b outside the effective optical path of the light as described in the first and the second embodiments.

The GH cell 32 comprises the first GH cell 33 and the second GH cell 34, which are placed side by side. The first GH cell 33 and the second GH cell 34 are both absorb or transmit the polarized component perpendicular to the polarized component which is absorbed by the polarizing plate 11a. For example, GH cells which are at the position where the GH cell 12 is rotated 90 degrees with respect to the axis of the incident light are used as the first GH cell 33 and the second GH cell 34.

The light controlling operation of the light controlling apparatus in accordance with the third embodiment is described herein under.

When the iris blades 18 and 19 are opened, the polarizing plate 11a is at the position outside the effective optical path 20, namely at the position of the polarizing plate 11b. Next, when the iris blades 18 and 19 moves to overlap each other, the polarizing plate 11b moves gradually into the effective optical path 20. When the overlapping of the iris blades 18 and 19 increases more, the polarizing plate 11a covers the entire aperture 22 finally. As the result, the first GH cell 33 and the second GH cell 34 absorb the polarized light component perpendicular to the polarized component which is to be absorbed by the polarizing plate 11a.

According to the above-mentioned third embodiment, the same effect as obtained by the first embodiment is obtained.

The GH cell 32 comprising the first cell 33 and the second cell 34 absorbs the polarized light component perpendicular to the polarized component which is to be absorbed by the polarizing plate 11a. In other words, the light which passed through the polarizing plate 11a is absorbed by the GH cell 32 which comprises two layers. Thus, the minimum transmittance of the light controlling apparatus is reduced to the lower level in comparison with the light controlling apparatus having a GH cell comprising one layer for absorption.

Liquid crystal molecule of negative dielectric anisotropy may be used and n-type dichromatic dye molecule may be used as the GH cell 32 to be used in the above-mentioned third embodiment.

Figure 6:
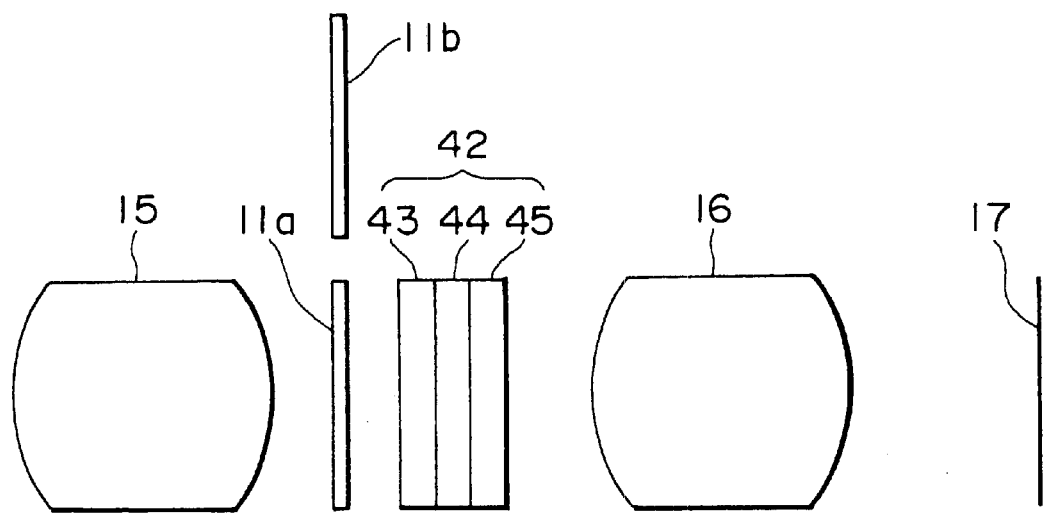
FIG. 6 is a side view of a light controlling apparatus in accordance with the fourth embodiment of the present invention.

FIG. 6 is a side view of a light controlling apparatus in accordance with the fourth embodiment of the present invention. The same components as used in the above-mentioned embodiments are given the same reference characters as described in the above-mentioned embodiments.

This light controlling apparatus comprises a polarizing plate 11a and a GH cell 42. The polarizing plate 11a is movable to the position which is indicated with the polarizing plate 11b outside the effective optical path of the light as described in the above-mentioned embodiments.

The GH cell comprises the first GH cell 43, the second GH cell 44, and the third GH cell 45, which are placed side by side each other. The first GH cell 43 absorbs or transmits the same polarized component as the polarized component which is absorbed by the polarizing plate 11a. The second GH cell 44 and the third GH cell 45 absorbs or transmits the polarized component perpendicular to the polarized component which is absorbed by the polarizing plate 11a. For example, the GH cell 12 used in the first embodiment is used as the first GH cell 43. For example, GH cells which are at the position where the GH cell 12 is rotated 90 degrees with respect to the axis of the incident light are used as the second GH cell 44 and the third GH cell 45.

The light controlling operation of the light controlling apparatus in accordance with the fourth embodiment is described.

When the iris blades 18 and 19 are opened, the polarizing plate 11a is at the position outside the effective optical path 20, namely at the position of the polarizing plate 11b. Then, the first GH cell 43 first absorbs the same polarized component in the direction as the polarized component which is to be absorbed by the polarizing plate 11b (11a) out of the light which has passed the front lens group 15.

Next, when the iris blades 18 and 19 are moved toward the center to overlap each other, the polarizing plate 11b moves gradually into the effective optical path 20. In the middle of covering the effective optical path 20 by the polarizing plate 11b (11a), the entire surface of the aperture 22 is not covered by the polarizing plate 11b (11a). However, the first GH cell 43 already absorbs the same polarized component in the direction as the polarized component which is to be absorbed by the polarizing plate 11a. As the result, the transmittance of the same polarized light component in the direction as the polarized component which is to be absorbed by the polarizing plate 11a of the portion of the aperture 22 where the polarizing plate 11a does not cover is equalized to that of the portion of the aperture 22 where the polarizing plate 11a covers.

When overlapping of the iris blades 18 and 19 increases more, the entire aperture 22 is covered finally by the polarizing plate 11a. Then, the second GH cell 44 and the third GH cell 45 absorb the polarized light component perpendicular to the polarized component which is to be absorbed by the polarizing plate 11a.

According to the above-mentioned fourth embodiment, the same effect as obtained by the first embodiment is obtained.

The both effects which are obtained by the second embodiment and the third embodiment are obtained simultaneously by the fourth embodiment.

Further, a combination of liquid crystals of positive dielectric anisotropy and negative dielectric anisotropy may be used, and a combination of p-type dichromatic dye and n-type dichromatic dye may be used as the GH cell 42 to be used in the above-mentioned fourth embodiment.

The order of arrangement of the first GH cells 23, 33, and 43, the second GH cells 24, 34, and 44, and the third GH cell 45 in the above-mentioned respective embodiments is by no means limited to the order of arrangement described in the above-mentioned second, third, and fourth embodiments. For example, the order of arrangement of the first GH cells 23, 33, and 43, the second GH cells 24, 34, and 44, and the third GH cell 45 may be reversed.

The polarizing plate 11a is located between the front lens group 15 and the rear lens group 16 with respect to the position of the GH cell 12, but the location is by no means limited to this location. The polarizing plate 11a may be located at the optimal location based on the setting condition of the imaging lens. In detail, unless an optical element which varies in polarization such as phase difference film is used, the polarizing plate 11a may be located, for example, between the imaging plate 17 and the rear lens group 16, or on arbitrary location such as the object side or the imaging device side. Further, the polarizing plate 11a may be located front or behind a single lens instead of the front lens group 15 or the rear lens group 16.

The number of blades 18 and 19 of the iris is by no means limited to two, but more blades may be used, and a single blade may be used.

The iris blades 18 and 19 are overlapped by moving vertically, but may be throttled from the periphery to the center.

The polarizing plate 11a is attached to the iris blade 18, but may be attached to the iris blade 19.

In the above-mentioned embodiments the light is controlled first by moving the polarizing plate 11a and subsequently by absorption by the GH cell 12 as the brightness of an object increases, however, the light is controlled first by absorption by the GH cell 12. In this case, the transmittance of the GH cell 12 decreases to a predetermined value and then the light is controlled by moving the polarizing plate 11a.

A mechanical iris is used as the means for moving the polarizing plate 11a inside/outside the effective optical path 20, however, the iris is by no means limited to a mechanical iris. For example, a mechanism in which a film to which the polarizing plate 11a is attached is fixed directly to a driving motor to move the polarizing plate 11a may be employed.

As described hereinbefore, according to the present invention, the contrast ratio is increased and the light quantity is maintained uniform.

What is claimed is:

1. A light controlling apparatus comprising:
   a liquid-crystal cell;
   a mechanical iris located on one side of said liquid crystal cell, said mechanical iris having a movable portion; and
   a polarizing plate which is movable inside/outside an optical path of light incident to said liquid crystal cell;
   wherein said polarizing plate is made movable inside/outside the optical path by providing the polarizing plate on the movable portion of said mechanical iris.

2. A light controlling apparatus as claimed in claim 1, wherein said liquid crystal cell is a guest-host type liquid crystal cell.

3. The light controlling apparatus of claim 2, wherein said movable portion of said mechanical iris is a movable first iris blade; and wherein said polarizing plate is attached to said movable first iris blade.

4. A light controlling apparatus as claimed in claim 1, wherein said liquid crystal cell comprises:
   a first guest-host type liquid crystal cell which is capable of switching between absorption and transmission of said light in the direction of a polarized component of said light which is absorbed by the polarizing plate; and
   a second guest-host type liquid crystal cell which is capable of switching between absorption and transmission of said light in a direction perpendicular to the polarized component of said light which is absorbed by the polarizing plate.

5. A light controlling apparatus as claimed in claim 1, wherein said liquid crystal cell comprises first and second guest-host type liquid crystal cells which are capable of switching between absorption and transmission of said light in a direction perpendicular to the polarized component of said light which is absorbed by said polarizing plate.

6. A light controlling apparatus as claimed in claim 1, wherein said liquid crystal cell comprises:
   a first guest-host type liquid crystal cell which is capable of switching between absorption and transmission of said light in the direction as the polarized component of said light which is absorbed by said polarizing plate; and
   second and third guest-host type liquid crystal cells which are capable of switching between absorption and transmission of said light in a direction perpendicular to the polarized component of said light which is absorbed by said polarizing plate.

7. The light controlling apparatus of claim 1, wherein said movable portion of said mechanical iris is a movable first iris blade; and wherein said polarizing plate is attached to said movable first iris blade.

8. A light controlling apparatus comprising:
   a first guest-host type liquid crystal cell, said first guest-host type liquid crystal cell positioned in an optical light path;
   a mechanical iris located on one side of said first guest-host type liquid cell, said mechanical iris having a movable first iris blade; and
   a polarizing plate, said polarizing plate attached to the movable first iris blade whereby said movable first iris blade can move said polarizing plate in or out of said optical light path and can polarize light in a first direction when light is travelling along said optical light path and results in polarized light when said polarizing plate is in said optical light path.

9. The light controlling apparatus of claim 8, wherein said first iris blade can move said polarizing plate in increments.

10. The light controlling apparatus of claim 8, wherein said first iris blade can move said polarizing plate in increments ranging from the polarizing plate being completely in the optical light path to the polarizing plate being completely outside the optical light path.

11. The light controlling apparatus of claim 8, wherein said first guest-host type liquid crystal cell is switchable between absorption and transmission of the polarized light.

12. The light controlling apparatus of claim 8, wherein said first guest-host type liquid crystal cell is switchable between absorption and transmission of the polarized light in the first polarized direction.

13. The light controlling apparatus of claim 8, further comprising a second guest-host type liquid crystal cell, said second guest-host type liquid crystal cell positioned in said optical light path downstream to said first guest-host type liquid crystal cell.

14. The light controlling apparatus of claim 13, wherein said second guest-host type liquid crystal cell is switchable between absorption and transmission of polarized light perpendicular to the first polarized direction.

15. The light controlling apparatus of claim 14, wherein said first guest-host type liquid crystal cell is switchable between absorption and transmission of perpendicular polarized light perpendicular to the first polarized direction.

16. The light controlling apparatus of claim 13, further comprising a third guest-host type liquid crystal cell, said third guest-host type liquid crystal cell positioned in said optical light path to said first and second guest-host type liquid crystal cells.

17. The light controlling apparatus of claim 16, wherein said second and third guest-host type liquid crystal cells are switchable between absorption and transmission of polarized light perpendicular to the first polarized direction.

18. The light controlling apparatus of claim 17, wherein said first guest-host type liquid crystal cell is switchable between absorption and transmission of the polarized light in the first polarized direction.

* * * * *